(12) United States Patent
Thomas et al.

(10) Patent No.: US 6,988,625 B2
(45) Date of Patent: Jan. 24, 2006

(54) FLUID FILTER WITH LOW-COST HOUSING

(75) Inventors: Chad M. Thomas, Jackson, TN (US); Charles W. Hawkins, Sparta, TN (US); Kevin C. South, Cookeville, TN (US); Mark Johnson, Cookeville, TN (US); Ravi Yekula, Cookeville, TN (US); Ricky England, Sparta, TN (US); Clint T. DeWeese, Cookeville, TN (US)

(73) Assignee: Fleetguard, Inc., Nashville, TN (US)

( * ) Notice: Subject to any disclaimer, the term of this patent is extended or adjusted under 35 U.S.C. 154(b) by 0 days.

(21) Appl. No.: 10/779,156

(22) Filed: Feb. 16, 2004

(65) Prior Publication Data
US 2005/0178715 A1 Aug. 18, 2005

(51) Int. Cl.
B01D 27/08 (2006.01)

(52) U.S. Cl. .............. 210/437; 210/441; 210/450; 210/454

(58) Field of Classification Search ............. 210/238, 210/454, 470, 416.4, 438, 493.2, 440, 441, 210/450, 451–453, 455, 437
See application file for complete search history.

(56) References Cited

U.S. PATENT DOCUMENTS

| | | | |
|---|---|---|---|
| 4,933,093 A | 6/1990 | Keller | 210/774 |
| 5,104,537 A | 4/1992 | Stifelman et al. | 210/440 |
| 5,258,118 A | 11/1993 | Gouritin et al. | 210/206 |
| 5,342,519 A | 8/1994 | Friedmann et al. | 210/232 |
| 5,462,658 A | 10/1995 | Sem | 210/172 |
| 5,855,772 A * | 1/1999 | Miller et al. | 210/86 |
| 5,868,932 A | 2/1999 | Guichaoua et al. | 210/440 |
| 5,985,144 A * | 11/1999 | Janik et al. | 210/233 |
| 6,264,831 B1 * | 7/2001 | Hawkins et al. | 210/86 |
| 6,361,684 B1 * | 3/2002 | Hawkins et al. | 210/91 |
| 6,607,665 B2 * | 8/2003 | Fick et al. | 210/238 |

* cited by examiner

Primary Examiner—Terry K. Cecil
(74) Attorney, Agent, or Firm—Woodard, Emhardt, Moriarty, McNett & Henry LLP

(57) ABSTRACT

A fuel-water separation filtration system for filtering fuel and for separating water out of the fuel includes a housing assembly, a filter element assembly, and a closing lid. The housing assembly includes a unitary molded housing, a plurality of flow connection fittings that are spin welded into the housing, and a standpipe that is spin welded to the housing. The filter element assembly includes a cover and an endplate and filter media with one end bonded to the cover and an opposite end bonded to the endplate. The standpipe includes an attachment portion that extends beyond the upper end of the filter element assembly and the closing lid is threadedly attached to the attachment portion for closing the housing assembly. The filtration system requires pressurization for proper operation and the filtration system cannot be pressurized without the filter element assembly being installed.

25 Claims, 18 Drawing Sheets

FLUID FILTER WITH LOW-COST HOUSING

BACKGROUND OF THE INVENTION

The present invention relates generally to the design and construction of a fluid filter that includes various design choices and options that help to reduce the overall cost of the fluid filter. These choices and options include the design of component parts and features as well as the overall fabrication method. More specifically, the present invention relates to the design of a fuel-water separator (FWS) filtration system with a molded synthetic housing. While various materials may be used for this housing, the preferred material is nylon 6/6 33 percent glass filled.

One of the considerations in the design and construction of fluid filtration products is the cost. This consideration does not preclude nor necessarily preempt other design considerations such as filtering efficiency, water separation, ease of use, and reliability. However, there is a substantial market for a FWS filtration system that focuses on a low-cost design and construction. While some of the lower cost features for the present invention may require a proportionately higher capital cost compared to other FWS designs, a sufficiently high volume demand would justify any higher capital cost.

In order to create the low-cost FWS filtration system of the present invention, one design focuses on the molded, synthetic material housing. Another design focuses on the filter element assembly that is received within the housing. Various molding techniques are incorporated into the fabrication of the housing in order to create a low-cost structure. For the filter element assembly, the techniques used for the sealing and the design of the endplates are the focal points for cost reduction measures. The disclosed molding techniques and the filter element assembly construction provide design features that are novel and unobvious.

SUMMARY OF THE INVENTION

A fuel-water separation filtration system for filtering fuel and separating water from the fuel for removal of the water, according to one embodiment of the present invention, comprises a housing assembly including a unitary housing, a plurality of flow connection fittings, and a standpipe, a fuel element assembly positioned within the housing and being constructed and arranged for sealing against the housing and for filtering a fuel, the standpipe extending through the filter element assembly and including an attachment portion axially extending beyond the filter element assembly, and a closing lid attachable to the attachment portion, the closing lid being manually tightenable for sealing closed the housing assembly wherein the pressurizing of the filtration system requires that the filter element assembly be installed in the housing.

One object of the present invention is to provide an improved fuel-water separator filtration system.

Related objects and advantages of the present invention will be apparent from the following description.

DESCRIPTION OF THE PREFERRED EMBODIMENT

Figure 1:
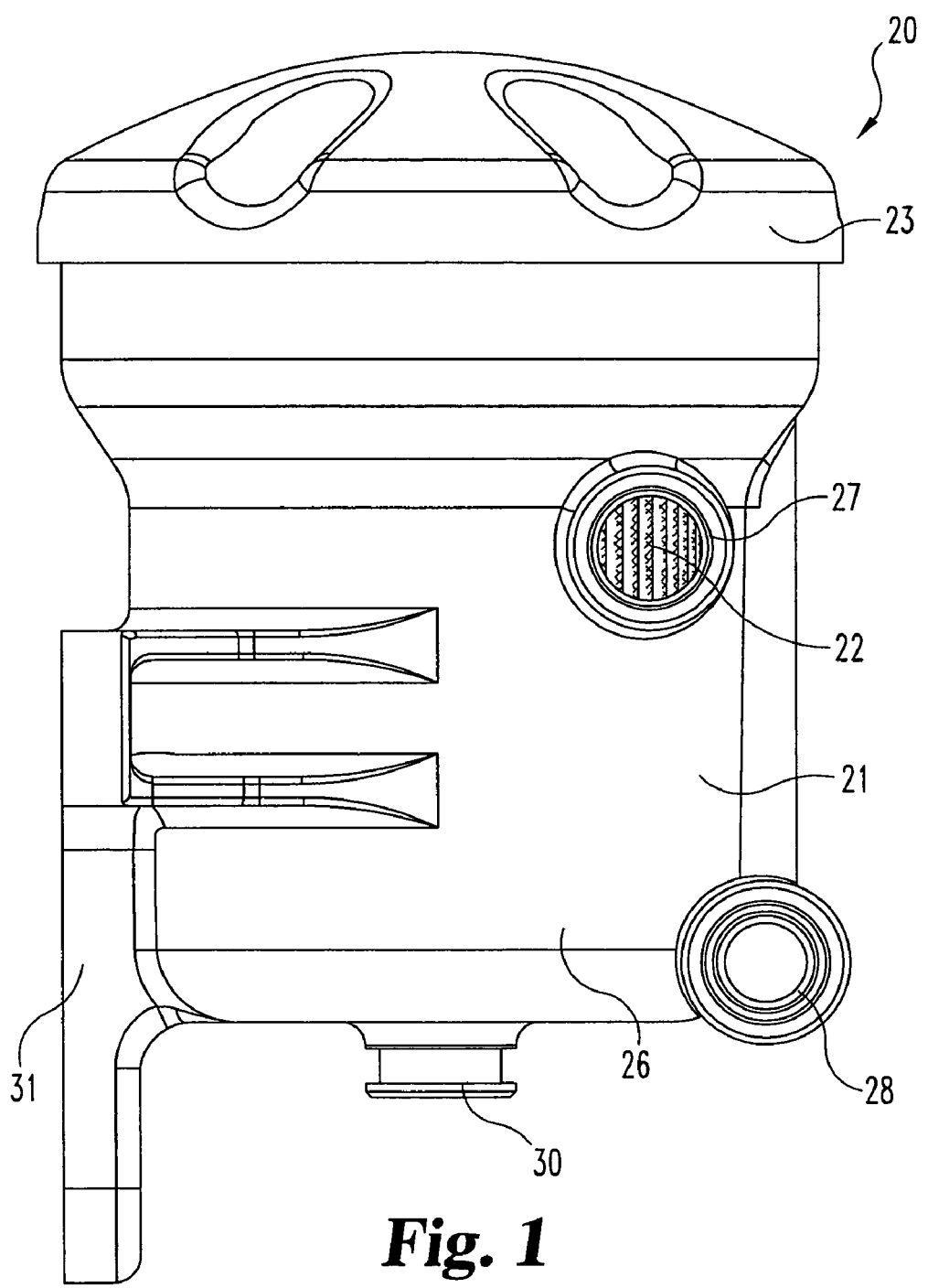
FIG. 1 is a side elevational view of a fuel-water separator filtration system according to a typical embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
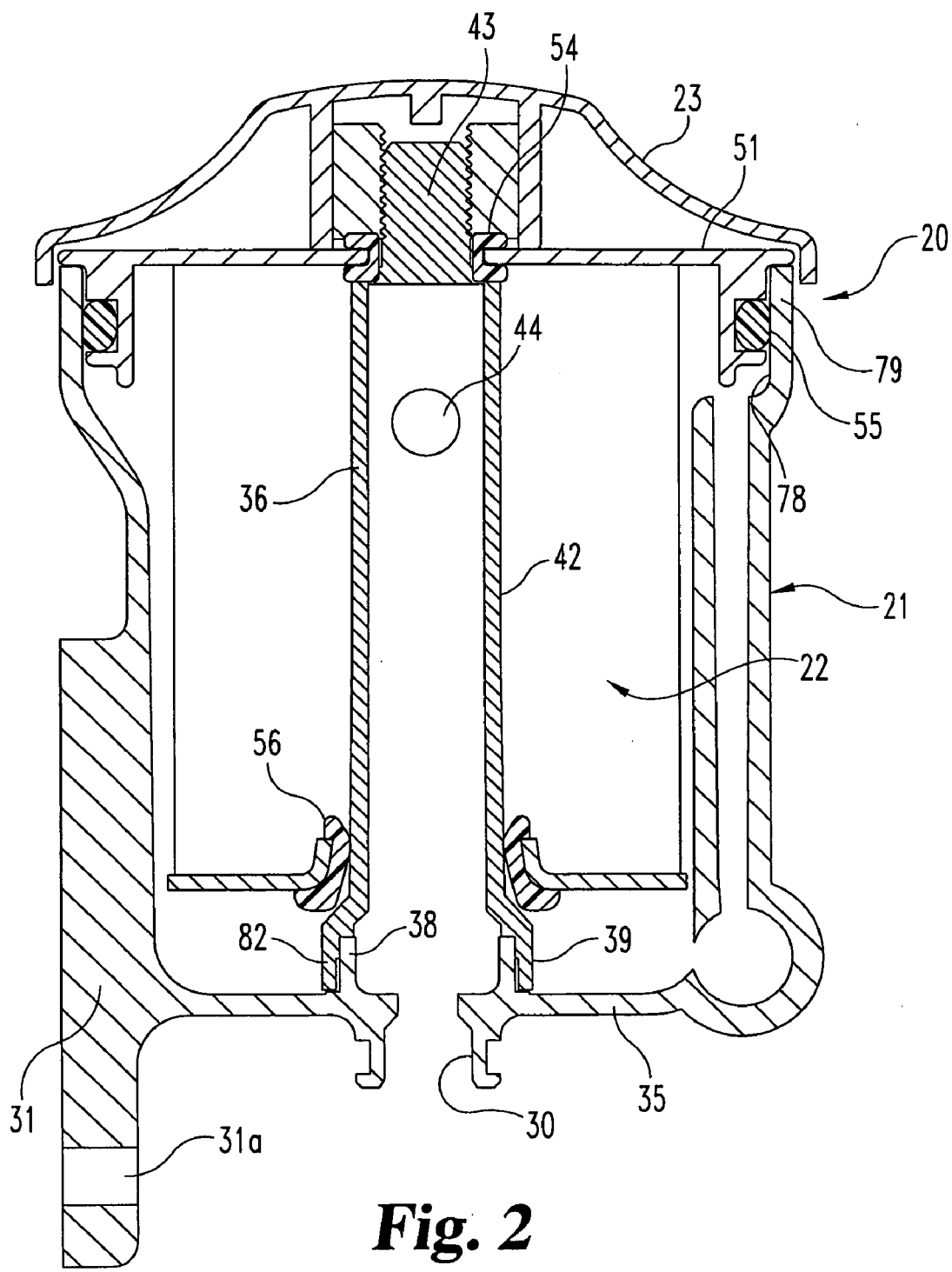
FIG. 2 is a side elevational view, in full section, of the FIG. 1 filtration system.

Referring to FIGS. 1 and 2, there is illustrated a fuel-water separation (FWS) filtration system 20 according to the present invention. Filtration system 20 includes a housing assembly 21, a filter element assembly 22, and a closing lid 23. Since the filtration system 20 must be pressurized in order to perform in the designed and intended manner, it will be seen that the filter element assembly 22 must be installed for sealing closed the housing assembly and, in turn, sealing closed the filtration system 20. The closing lid 23 cooperates with the filter element assembly 22 to close the housing assembly so that the filtration system can be pressurized.

Figure 3:
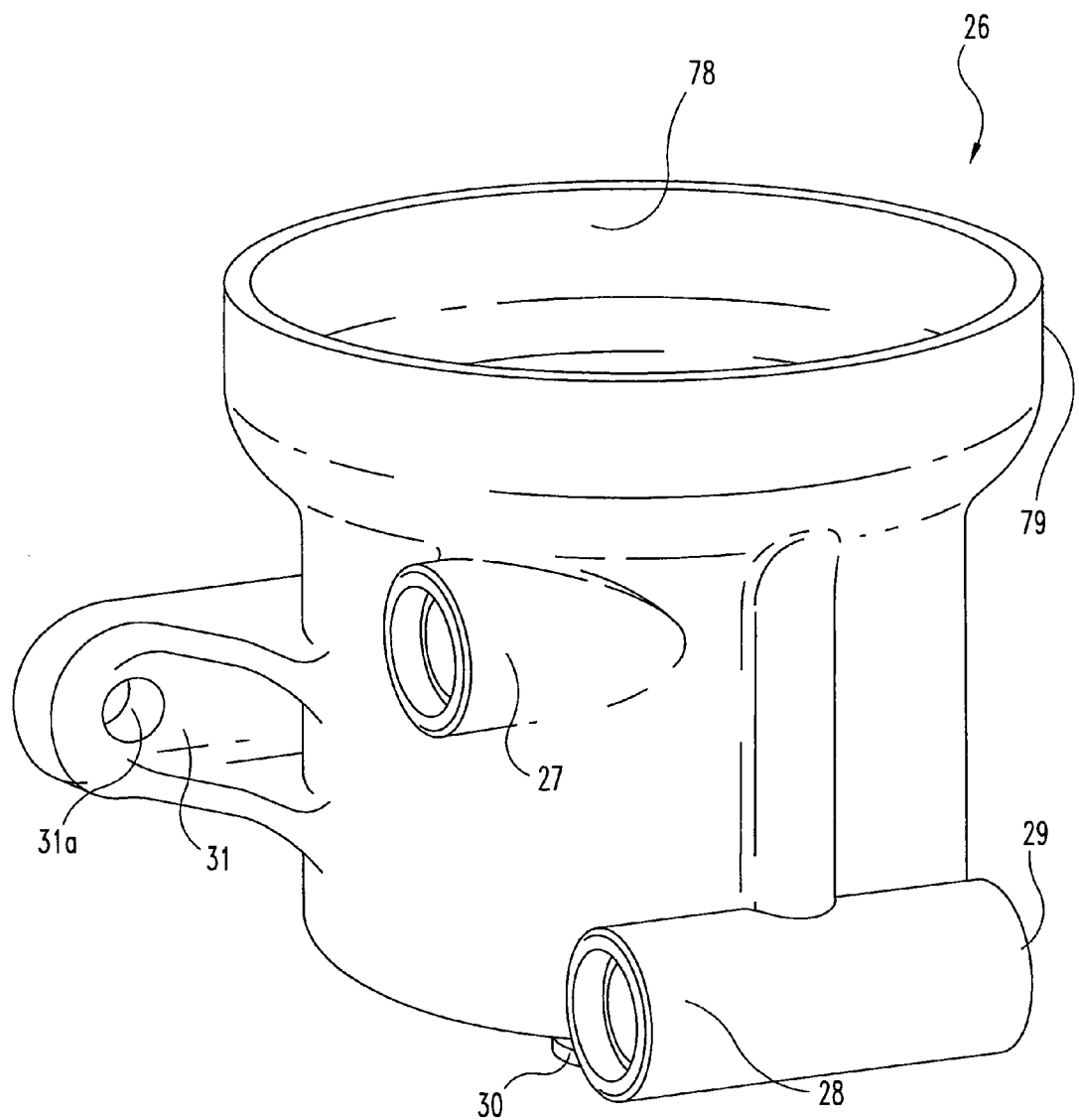
FIG. 3 is a perspective view of a unitary housing comprising one component of the FIG. 1 filtration system.

The housing assembly 21 includes a unitary, molded, synthetic material housing 26 (see FIG. 3) which is constructed and arranged with a hollow interior and fluid flow ports 27, 28, 29, and 30. A mounting flange 31 is included as part of the housing 26 and defines two clearance holes 31*a* for mounting or attaching the filtration system 20 to another structure. For added support, a second mounting flange can be used and would be positioned closer to the open end that receives the closing lid 23.

Figure 4:
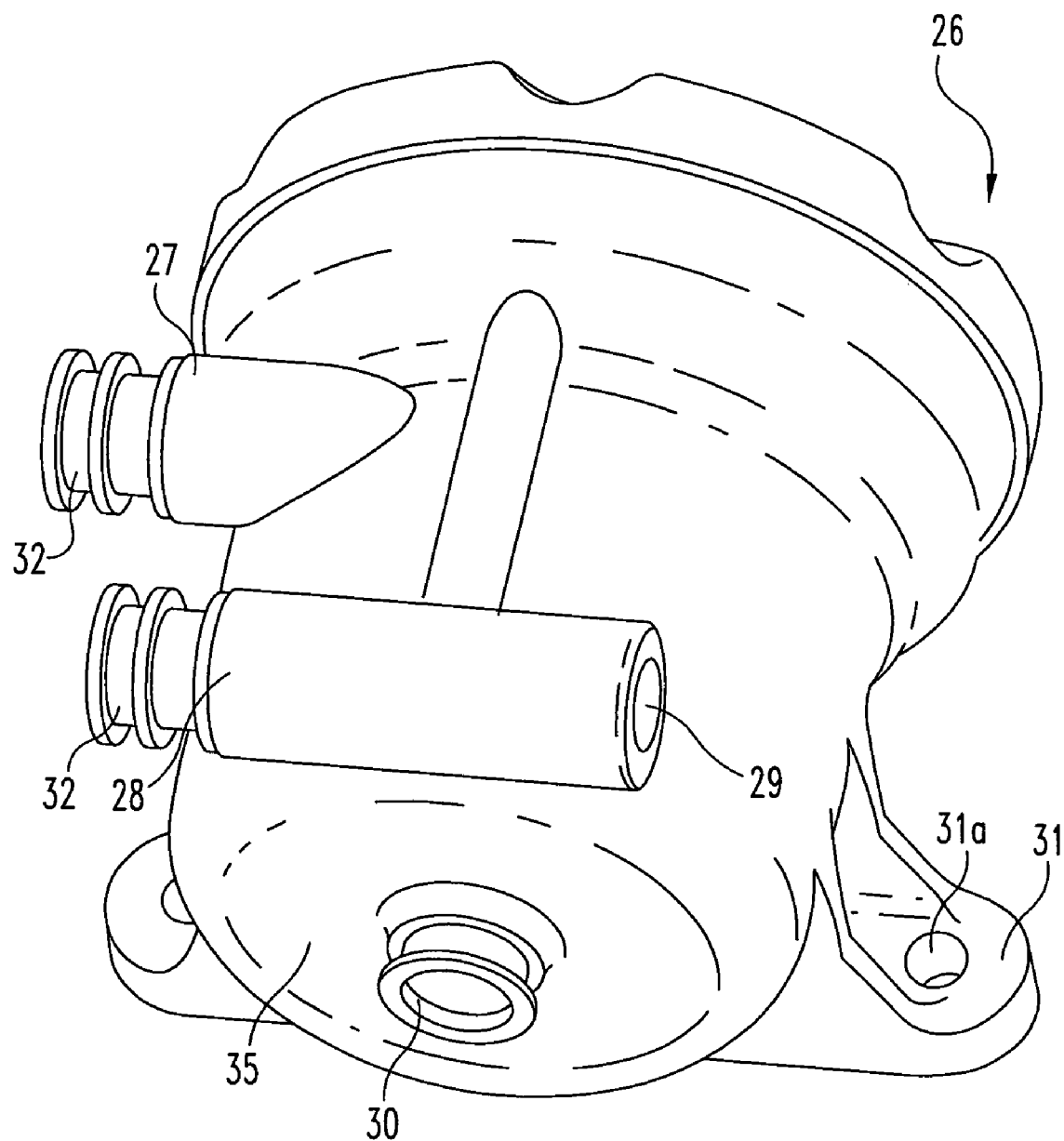
FIG. 4 is a perspective view of the FIG. 3 housing including flow fittings assembled therein.

A flow connection fitting 32 (see FIGS. 10 and 11) is assembled into port 27 (see FIG. 4) for a "fuel-in" connection. A similar flow connection fitting 32 is assembled into port 28 for the return of fuel to the fuel tank. Port 29 provides an auxiliary diagnostic port for removal of water and is internally threaded for facilitating the desired connection. Preferably, fittings 32 are of a unitary, molded construction using a synthetic material.

Figure 5:
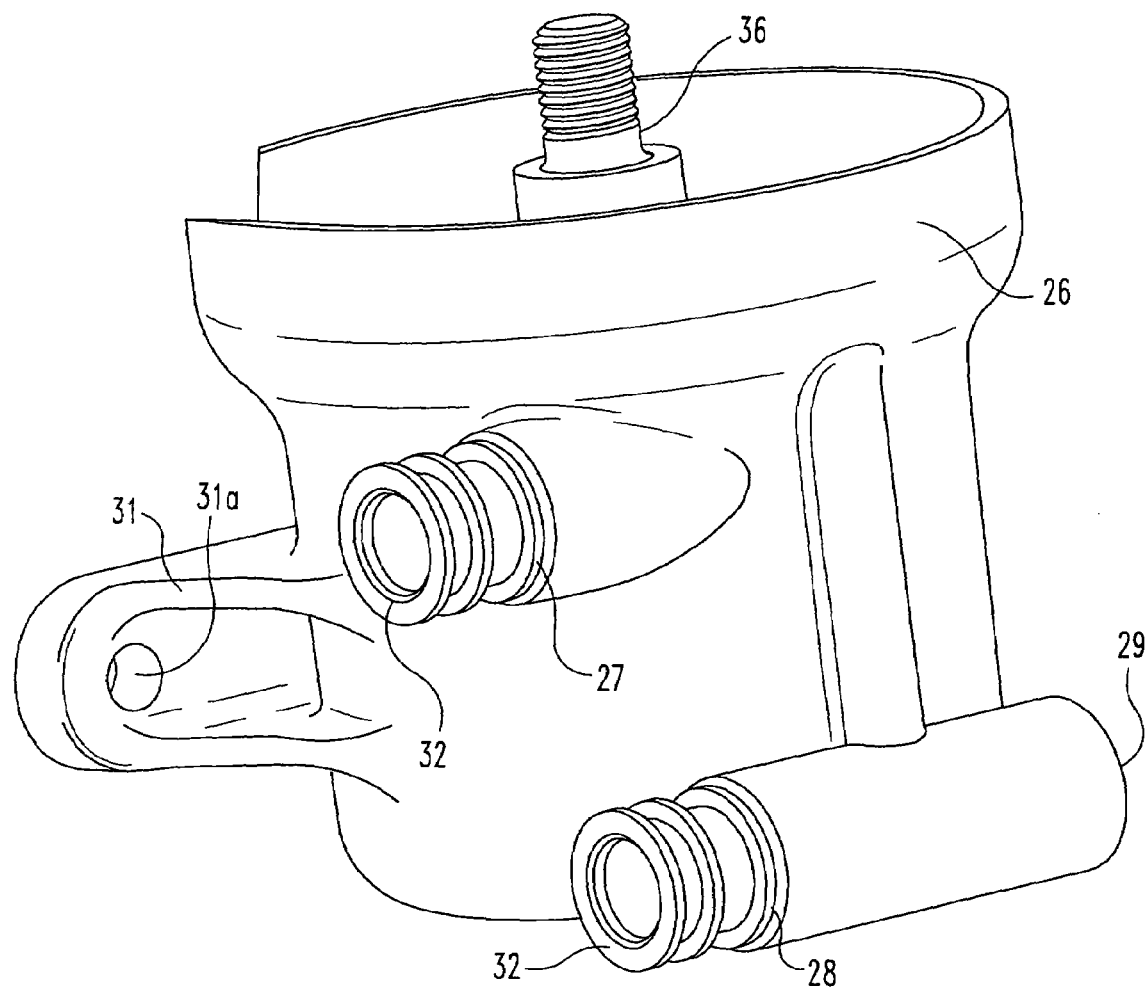
FIG. 5 is a perspective view of the FIG. 4 housing including a standpipe assembled thereto.

Port 30 provides a "fuel-out" path for fuel that has been filtered by the filter element assembly 22. Port 30 opens through the base 35 of housing 26 and communicates with the interior of the standpipe 36 (see FIGS. 8 and 9). FIG. 5 provides an illustration of the housing assembly 21 with the two flow connection fittings 32 and the standpipe 36 installed. The installation or assembly of these components into housing 26 is preferably by means of a spin weld and this results in an integral assembly. Alternative assembly techniques would include a threaded connection as one option and a press fit or interference fit as a second option, which may or may not be assisted by the addition of a suitable adhesive.

One option for this aspect of the overall design of filtration system 20 and in particular housing assembly 21 is to insert metal fittings into ports 27 and 28. The housing illustrations of FIGS. 4 and 5 do not change in any noticeable fashion if inserted metal fittings replace synthetic material fittings for the flow connection fittings 32. A further design option is to construct and arrange the base 35 of housing 26 such that port 30 is created by designing an opening in the base and using an inserted fitting at this location. This optional fuel-out fitting can be spin welded or can be an inserted metal fitting. Here again, the alternatives of a threaded interface, an interference fit, and/or the use of adhesive would present viable options.

Figure 10:
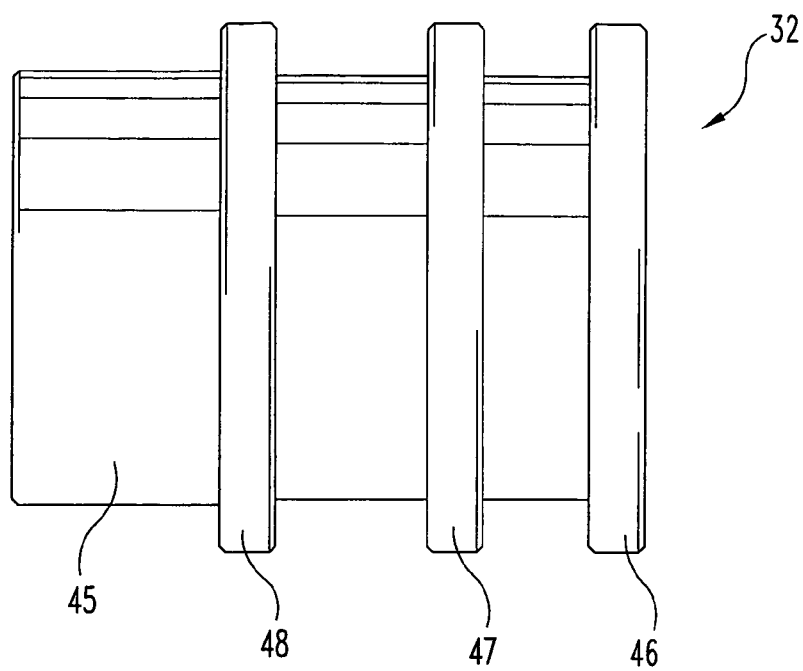
FIG. 10 is a front elevational view of the flow fitting of FIG. 4.
Figure 11:
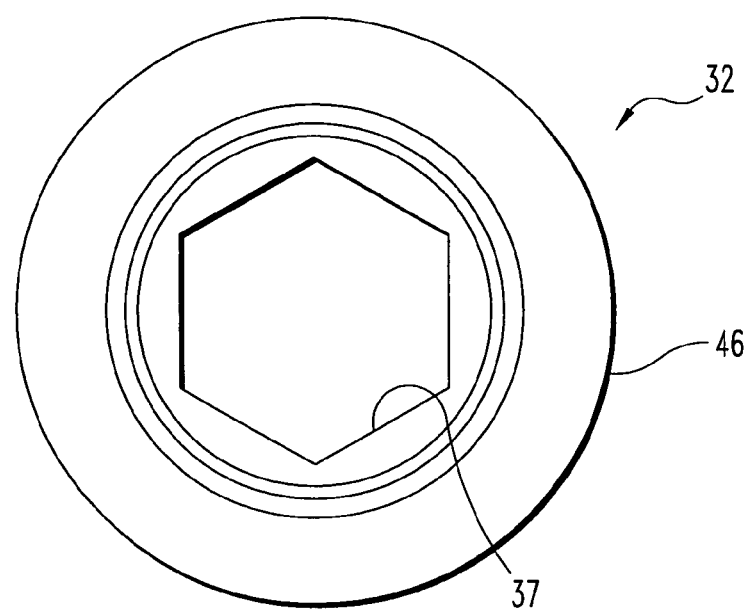
FIG. 11 is a top plan view of the FIG. 10 flow fitting.
Figure 12:
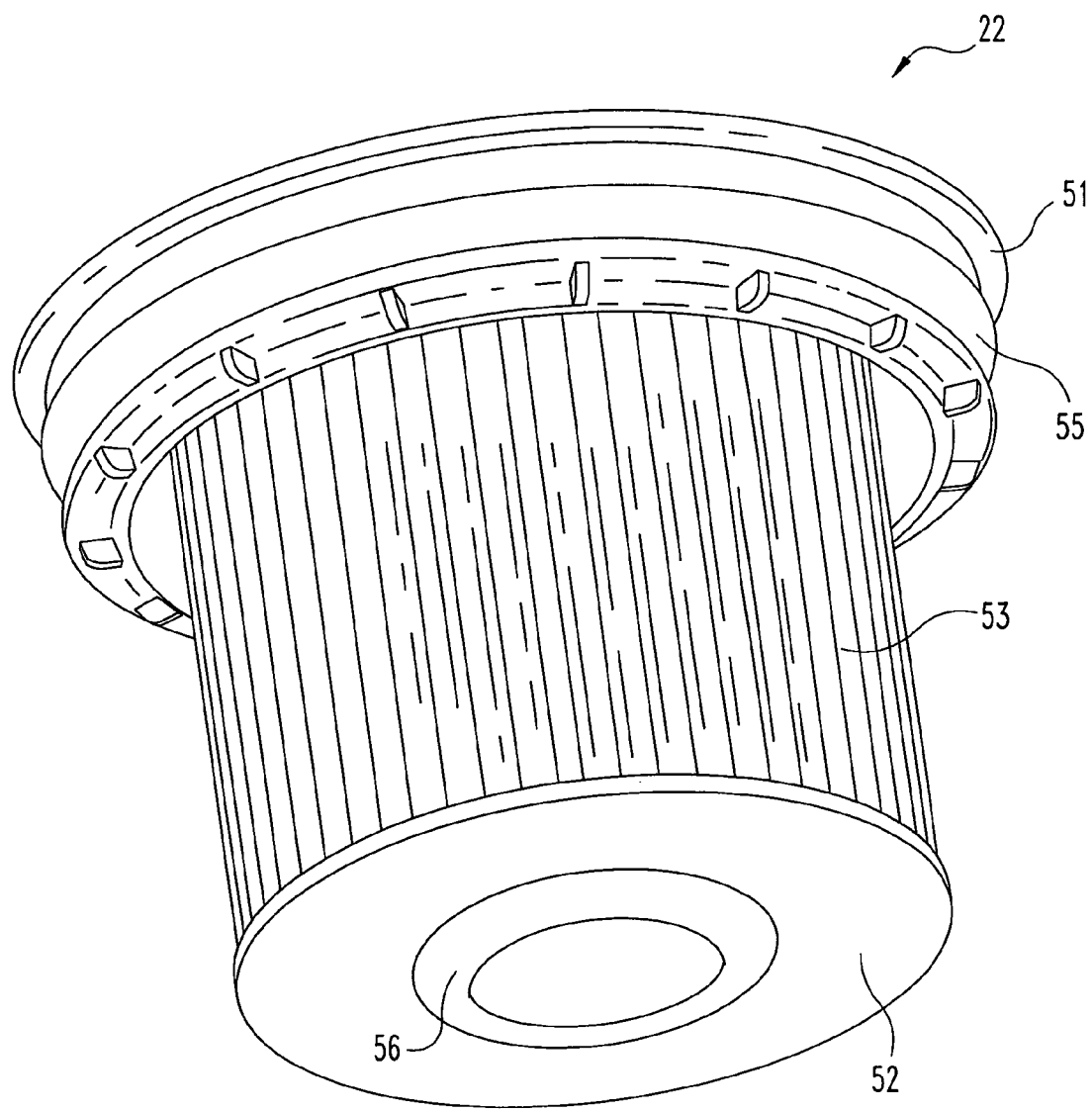
FIG. 12 is a bottom perspective view of a filter element assembly comprising another component of the FIG. 1 filtration system.
Figure 13:
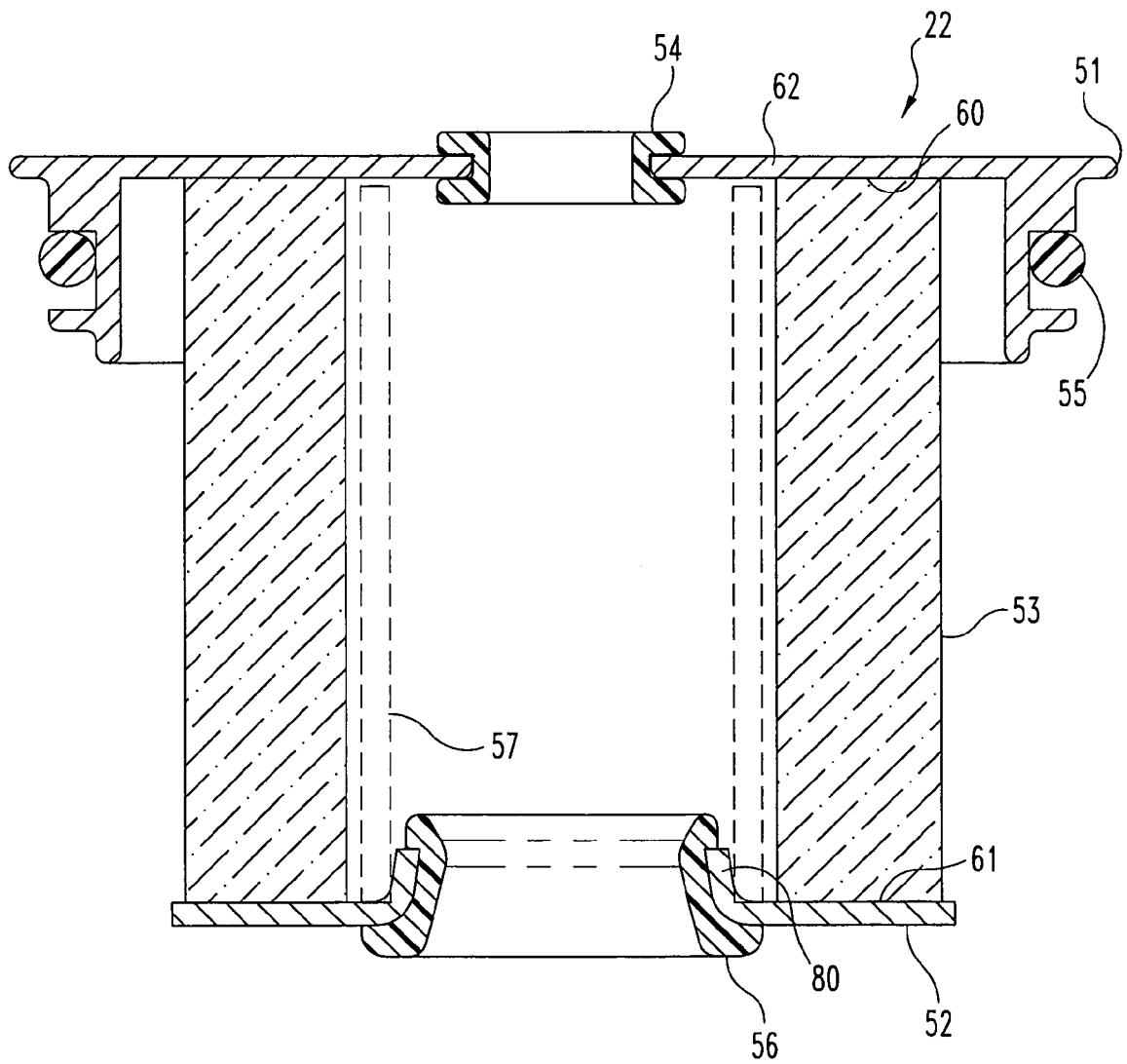
FIG. 13 is a front elevational view, in full section, of the FIG. 12 filter element assembly.
Figure 14:
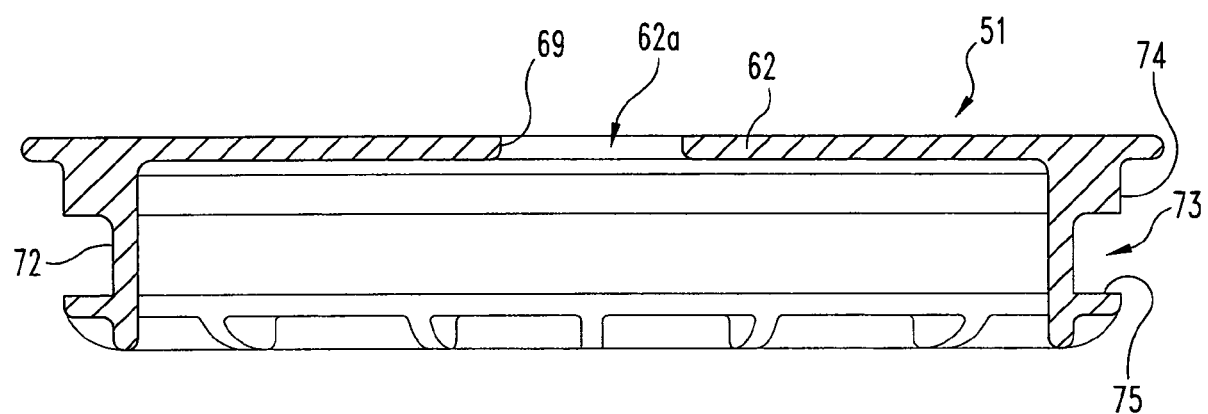
FIG. 14 is a front elevational view, in full section, of a cover comprising one component of the FIG. 12 filter element assembly.

Regardless of the style of fitting 32 that is selected (synthetic material or metal), its FIG. 10 shape and geometry remain virtually the same. In order to facilitate the insertion and installation of each fitting 32, its interior is shaped with a hex drive 37, as is illustrated in FIG. 1. The availability of hex drive 37 enables the use of a hex driver (Allen wrench) or similar tool to install and properly seat each flow connection fitting 32. The external geometry and structure for each flow connection fitting 32 can be configured to a customer's specifications.

Figure 6:
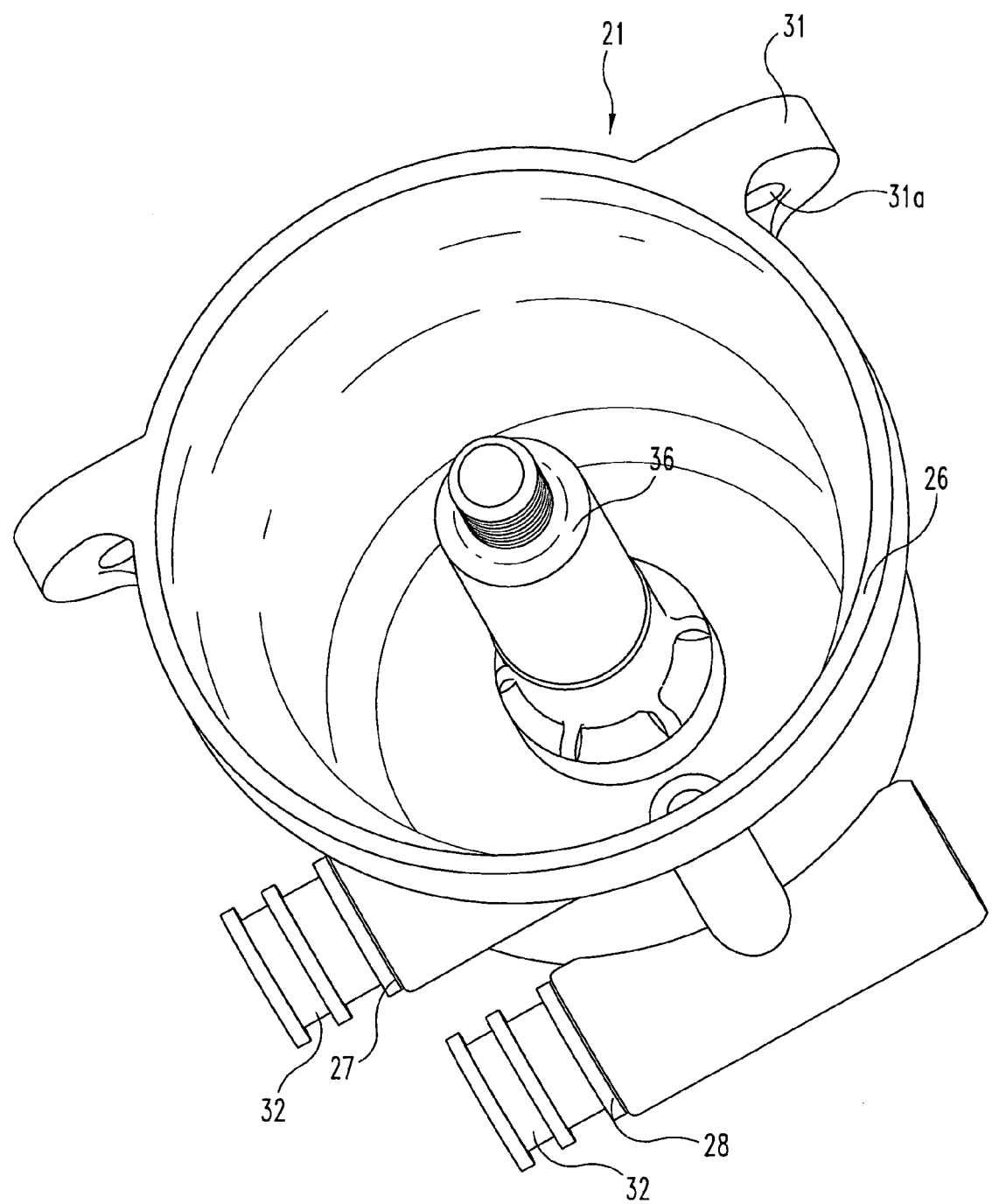
FIG. 6 is a top perspective view of the FIG. 5 housing.
Figure 7:
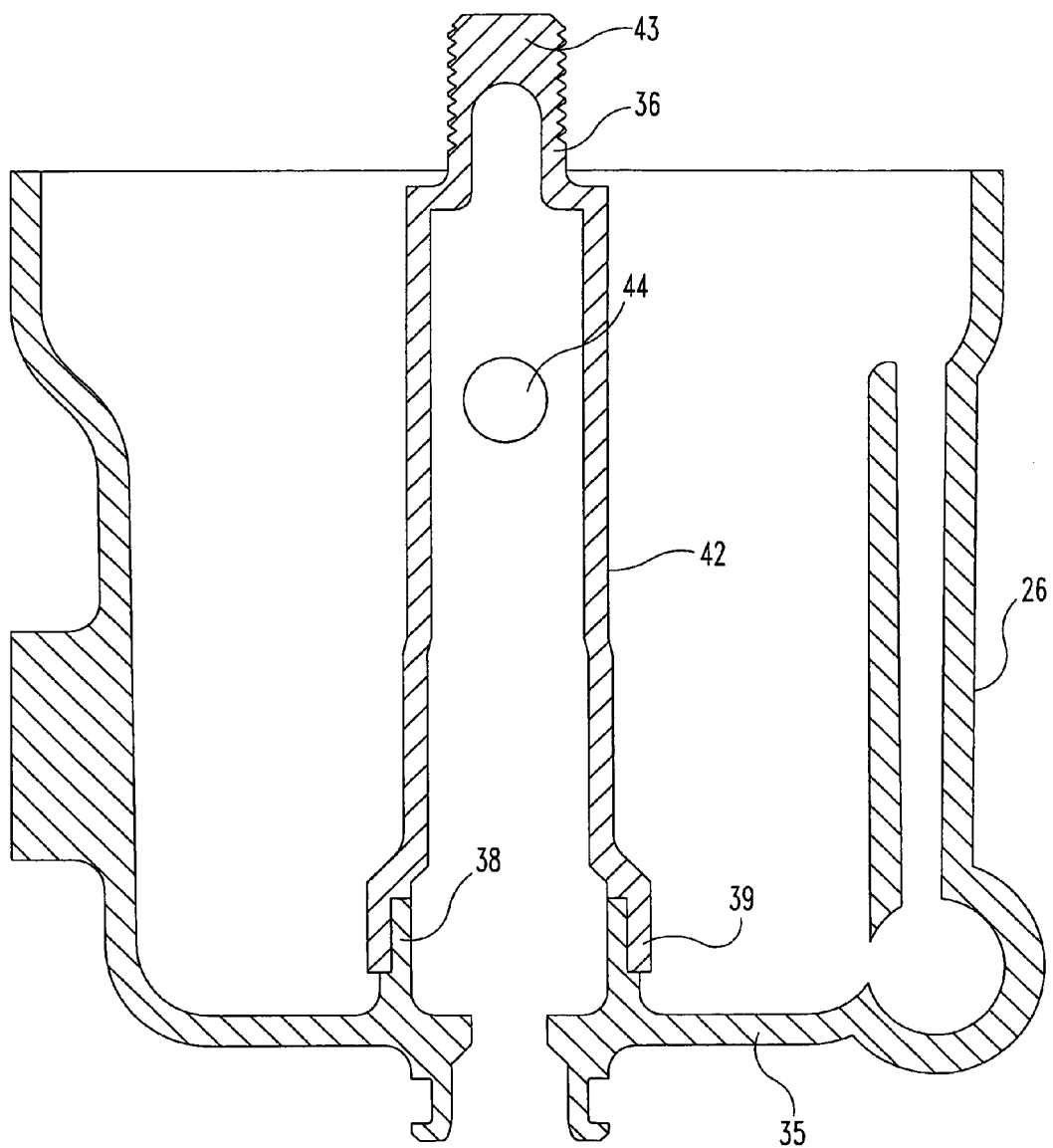
FIG. 7 is a partial, side elevational view, in full section, of the FIG. 6 housing showing the attachment of the standpipe.

Referring now to FIG. 6, a top, perspective view of the housing assembly 21 is provided. This view shows the open or hollow interior of the housing and the installation of standpipe 36 (see FIGS. 8 and 9). The assembly of standpipe 36 into housing 26 is also illustrated in FIG. 7. This partial, section view details the interior shape of housing 26 including the closed base and the mounting post or hub 38 that is a unitary part of base 35 and, in turn, a unitary part of housing 26 and typically a unitary part of fuel-out port 30.

The hub 38 is cylindrical and hollow and receives the enlarged base portion 39 of standpipe 36 with a sliding fit, as illustrated. This connection between base portion 39 and standpipe 36 can be as is illustrated or can be reversed with the standpipe 36 fitting inside of the hub 38. However, the illustrated connection is preferred and the standpipe 36 is securely attached or connected to hub 38 by a spin weld. While a number of materials are suitable for a spin weld type of connection or attachment, the preferred materials for the present invention include nylon 6/6 33 percent glass filled for the housing 26, the standpipe 36, and the flow connection fittings 32. If the metal fitting option for fittings 32 is selected, then the nylon material is replaced with metal. The hex drive feature remains a part of the fitting 32 design, regardless of the material choice. If a metal fitting is chosen, the preferred method is to insert mold the fitting into the housing.

Figure 8:
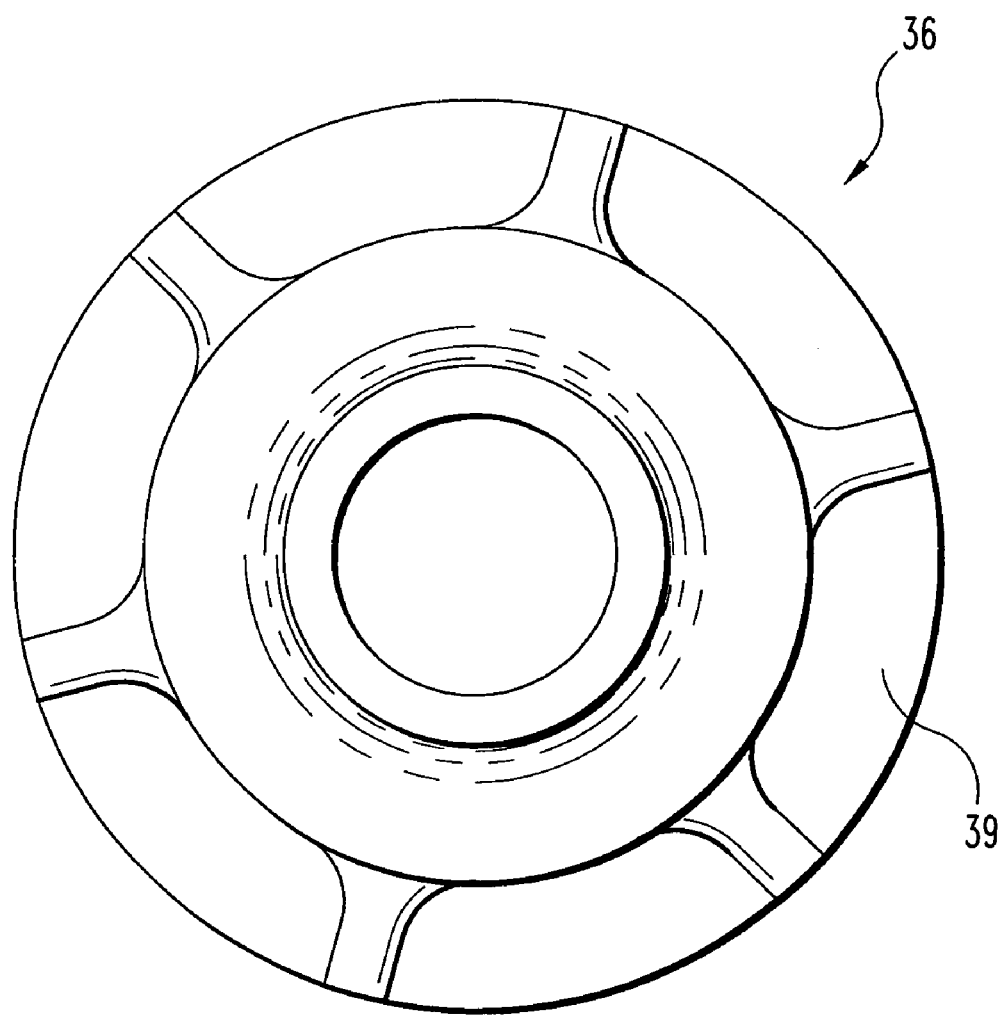
FIG. 8 is a top plan view of the standpipe.
Figure 9:
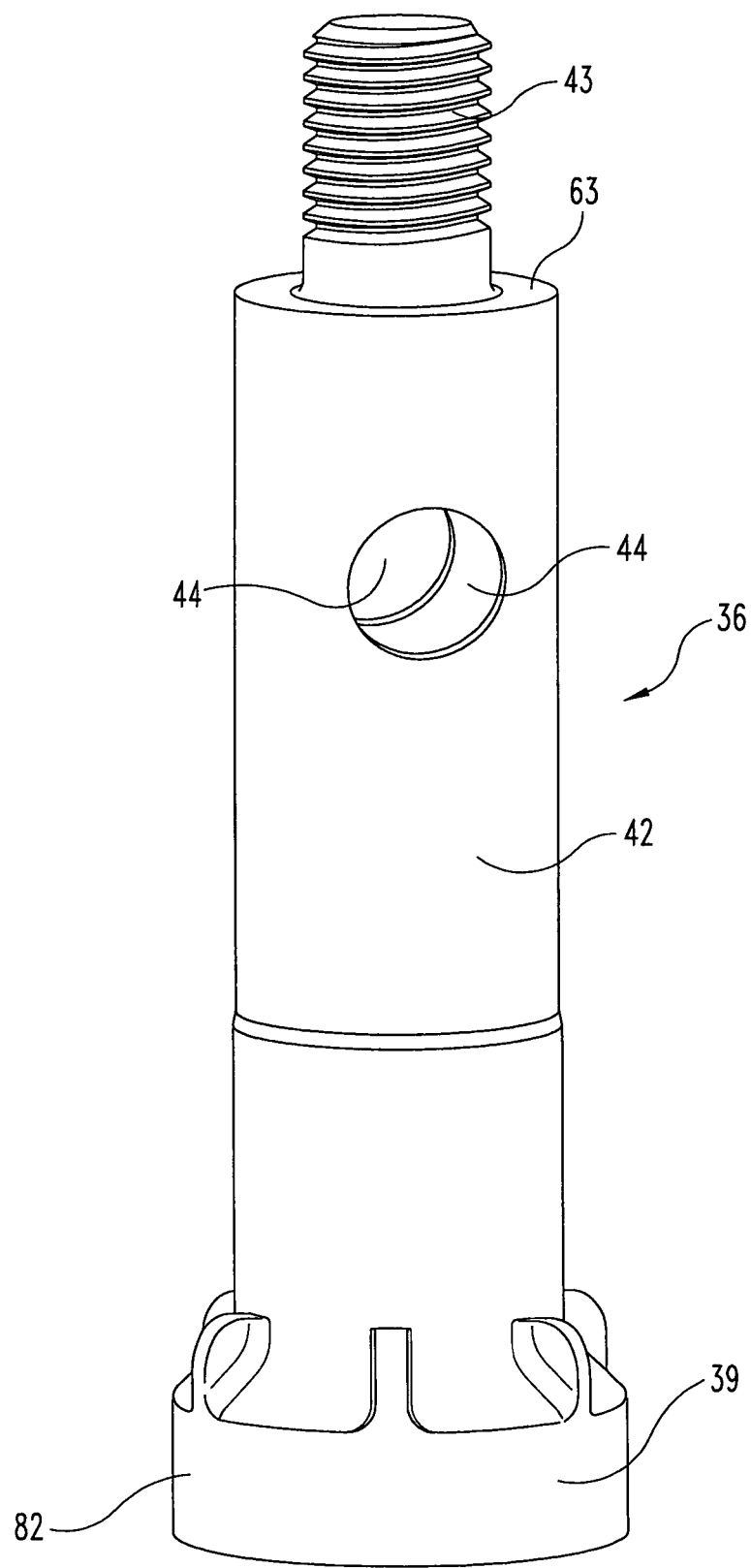
FIG. 9 is a front perspective view of the standpipe.

With continued reference to FIGS. 7, 8, and 9, it will be seen that the standpipe 36 has a generally cylindrical, hollow body 42 with base portion 39 at one end and an externally-threaded post 43 at the opposite end. The post 43 is closed such that the only entrance for fuel to enter standpipe 36 is by way of the pair of oppositely-disposed flow openings 44 defined by the hollow body 42. Fuel passing through the filter media is forced to flow into the hollow interior of standpipe 36 via openings 44. The exit flow path extends downwardly toward base 35 and the filtered fuel exits from the housing by way of port 30.

With continued reference to FIGS. 9 and 10, unitary fitting 32 includes a hollow annular body 45 with a series of annular ribs 46, 47 and 48. In the preferred embodiment of the present invention, the annular body 45 is cylindrical as are ribs 46–48. The ribs 46–48 are of the same outside diameter and are concentric to and unitary with the body 45. The axial spacing between ribs 46 and 47 is slightly shorter than the axial spacing between ribs 47 and 48 in order to provide the desired connection interface with a fluid conduit. It is also envisioned that alternative fitting 32 configurations that do not include any ribs can be used for the present invention.

Referring now to FIGS. 12–16, the details of the filter element assembly 22 are illustrated. The filter element assembly 22 includes a cover 51, an endplate 52, filter media 53, and annular seals 54, 55, and 56 (see FIG. 2). A centertube 57 is illustrated in broken line form since it is considered to be an optional component, depending on the design and construction of the filter media 53. The filter media 53, typically a pleated material, is bonded to the cover 51, by end 60 of filter media 53 being imbedded into the inside surface of cover 51. In a similar fashion, the opposite end 61 of the filter media 53 is bonded to the inner surface of endplate 52 by opposite end 61 of the filter media 53 being embedded into endplate 52. As previously mentioned, the filter element assembly 22 must be properly installed in order to pressurize the assembled filtration system 20. While filter element assembly 22 is used with a molded plastic housing for this "no-filter, no-run" feature, this same feature can be used with a cast aluminum housing.

The concept of "embedded" involves heating the plastic of an endplate or canister or cover to the point that the exposed surface or layer of plastic softens such that the filter media can be joined to that plastic structure. An exposed end of the filter media is forced into the softened plastic such that when the plastic hardens, the end of the filter media is sealed closed and is securely joined to the corresponding structure.

Cover 51 (see FIG. 14) is a unitary structure that is fabricated out of nylon 6/6 33 percent glass. The upper wall 62 defines a clearance opening 62*a* that receives seal 54 and the interior of seal 54 receives the post 43 of the standpipe 36. Looking closely at FIG. 9 and at FIG. 2, it will be seen that the hollow body 42 of standpipe 36 terminates in a substantially flat upper wall 63 that denotes the point of change from body 42 to post 43. It will also be noted that the lower portion of post 43, i.e., that portion adjacent to upper wall 63, is not threaded and its outside diameter surface is substantially normal to the surface of upper wall 63. This structure for standpipe 36 and the cooperating structure of lid 23 results in compressive axial sealing between the standpipe 36 and cover 51 (see FIG. 2). As the lid 23 is threadedly tightened onto threaded post 43, the lower surface 64 of the steel nut 65 of lid 23 axially presses against (compresses) seal 54. This force is transmitted through seal 54 such that its double-sided construction compresses against the opposite sides of the upper wall 62 and axially presses against upper wall 63. This is all illustrated in FIG. 2.

Figure 15:
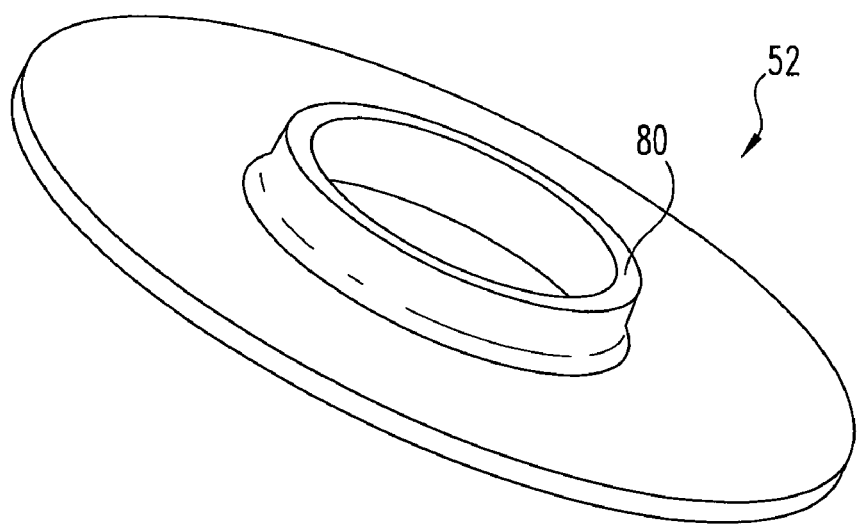
FIG. 15 is a perspective view of an endcap comprising one component of the FIG. 12 filter element assembly.
Figure 16:
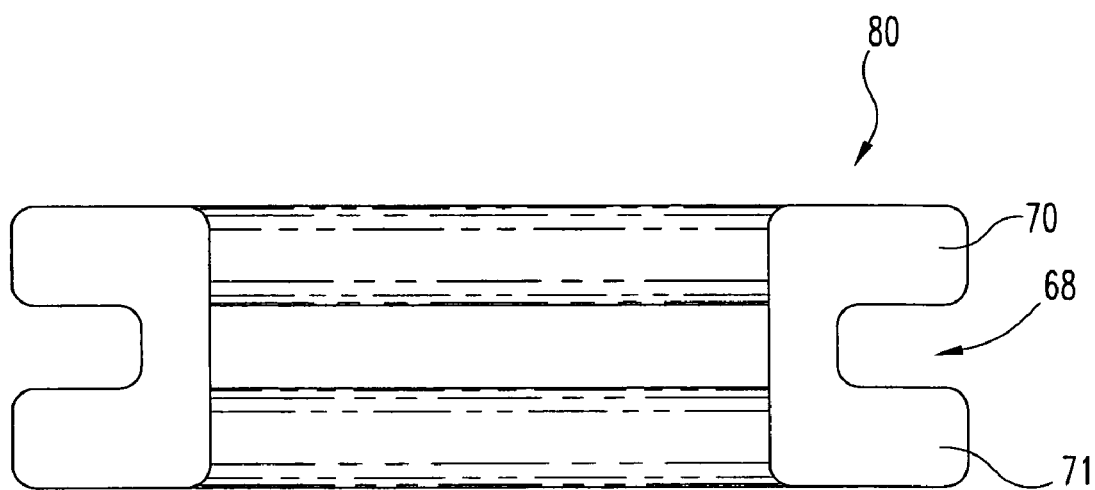
FIG. 16 is a front elevational view, in full section, of a seal comprising one component of the FIG. 12 filter element assembly.

The details of seal 54 are illustrated in FIG. 16 and the defined channel 68 that receives the annular inner edge 69 of cover 51 is positioned between radial lips 70 and 71. The flexibility of seal 54 allows it to be manually fitted onto edge 69. Preferably, seal 54 is molded as a unitary component out of nitrile rubber. A suitable material alternative for seal 44 is Viton®. This material is suitable to maintain sufficient resilience and flexibility for the required sealing, as described, over a significant duty cycle. The lid 23 is illustrated FIGS. 17 and 18 and the endplate 52 is illustrated in FIG. 15. O-ring seal 55 and seal 56 are not separately illustrated, but their design, location, and function are adequately detailed by FIG. 2.

As will be seen, unitary cover 51 includes an annular sidewall 72 that is shaped with an annular O-ring channel 73 for receiving seal 55. The diameter sizes and cross sectional geometries are such that once the O-ring seal 55 is stretched over defining portions 74 and 75 to fit into channel 73, the O-ring seal 55 is captured and remains as part of the cover subassembly. The O-ring seal 55 is radially compressed between the cover 51 (the base of channel 73) and the inner surface 78 of the flared upper (open) end 79 of housing 26 (see FIGS. 3 and 6). This sealing location is designed to prevent fuel leakage past the cover 51 adjacent its outer edge contact to the housing 26, as illustrated in FIG. 2.

Seal 56 is positioned around the formed, inner lip 80 of endplate 52 (see FIG. 15) and seals against the standpipe 36. As previously explained, the standpipe 36 includes a hollow body 42 and a base portion 39. There is a tapered transitioning portion between the generally cylindrical hollow body 42 and the cylindrical portion 82 of base portion 39. Seal 56, due to its shape, is designed to sealed against the outer surface of the hollow body 42. This sealing configuration is illustrated in FIG. 2. The geometry of lip 80 and the design of seal 56 allow the seal to be assembled onto the lip 80 and retained or captured in that fashion.

Figure 17:
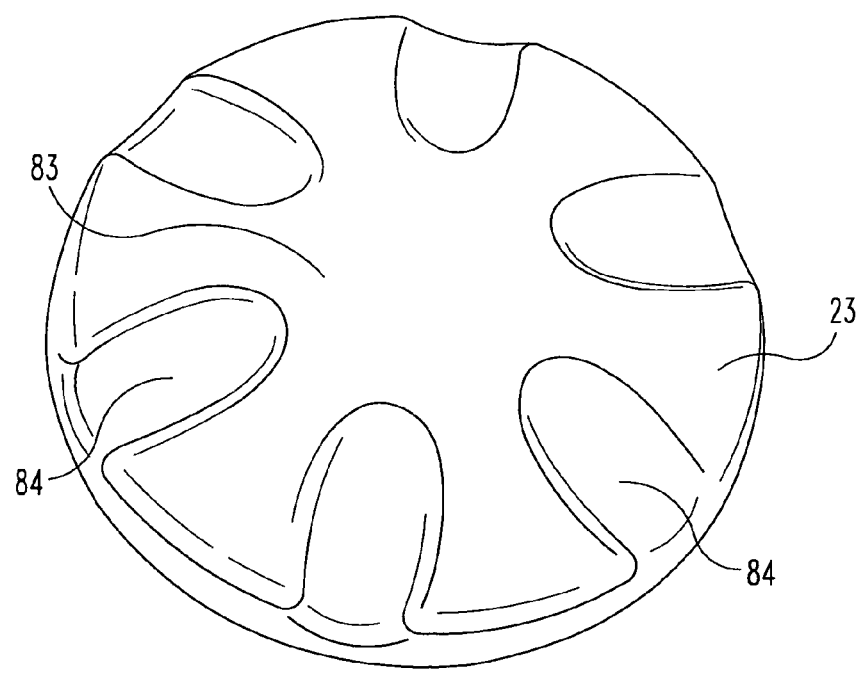
FIG. 17 is a top perspective view of a covering lid comprising another component of the FIG. 1 filtration system.
Figure 18:
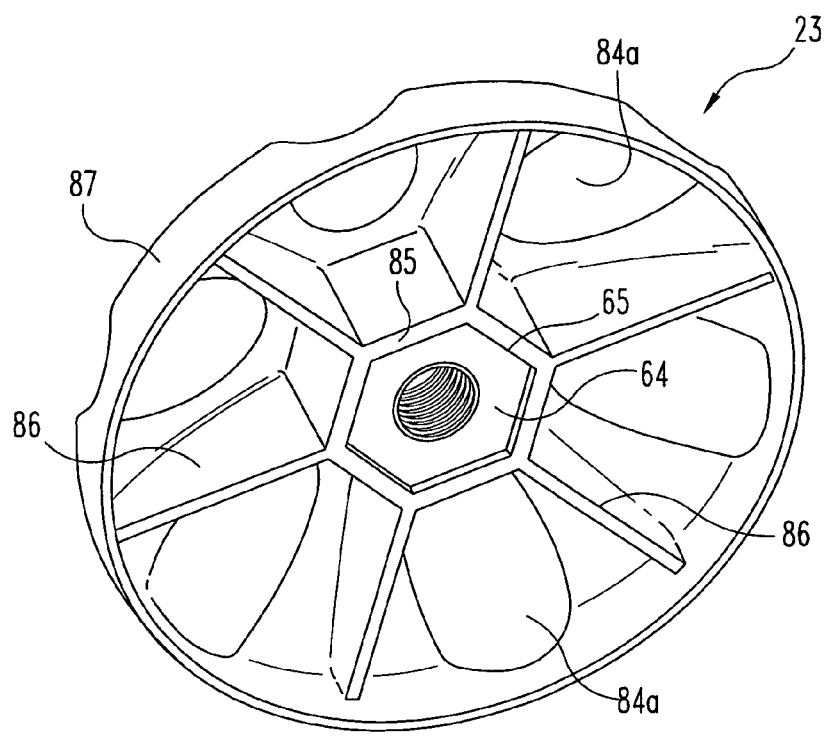
FIG. 18 is a bottom perspective view of the FIG. 17 covering lid.

Referring now to FIGS. 17 and 18, closing lid 23 includes a contoured top surface 83 with a series of spaced recesses 84 that provide gripping indentations to facilitate the manual tightening and untightening of the lid 23 relative to the standpipe 36. The underside interior of lid 23 includes a centered hex recess 85 that receives the steel hex nut 65. The lid without the inserted nut 65 is a unitary component that is preferably fabricated out of nylon 6/6 33 percent glass. Radiating outwardly from the points or "corners" of the hex recess are wall segments 86. A different wall segment 86 is centered between each pair of adjacent recesses 84, noting that on the underside of lid 23, these recesses appear as raised areas 84a. Each wall segment is joined to the lid underside and connects between its corresponding hex point and the inner surface of annular wall 87. As an alternative construction for closing lid 23, it is envisioned that the hex nut 65 is to be replaced with molded-in, internal plastic threads.

As explained, one focus of the present invention is to design a FWS filtration system as a low-cost product. This is achieved by the component part designs that are part of the system and by the fabrication and assembly techniques that are used. The results, as described above, include a unitary housing with spin welded, fuel quick connect fittings or alternatively with insert molded metal fittings. Additionally, the resultant system design includes a unitary housing with a spin welded standpipe and this option eliminates the need for any threads at the base (bottom) of the housing. Although a threaded connection was discussed as one alternative, the lower cost approach from the standpoint of the mold design and the overall configuration of filtration system 20, is to use a spin weld for the standpipe and housing connection. Further, by using the standpipe 36 for the threaded assembly and attachment of the closing lid, the unitary housing does not require any threads for receiving the lid.

The low-cost design features also include the filter element assembly 22. In this area, the filter media is imbedded within the cover 51 and within the endplate 52. A radial O-ring seal 55 in the cover is used to seal closed the housing. Further, the closing lid 23 is contoured on its outer, upper surface to enable hand-tight installation. A still further low-cost feature is the use of a molded-in sealing feature. This molded-in sealing option is applicable to seal 56, as one example.

Figure 19:
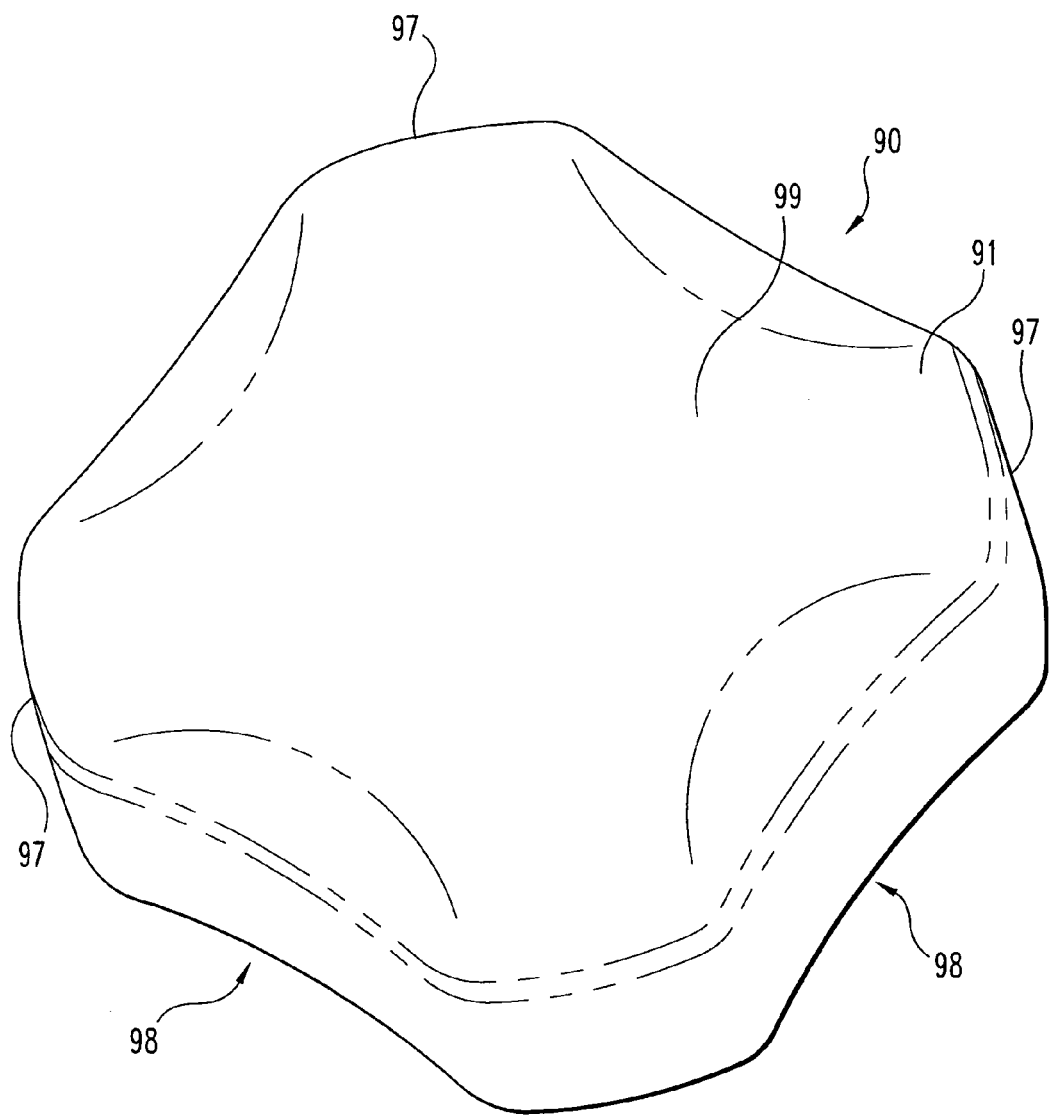
FIG. 19 is a top perspective view of an alternate embodiment for a closing cap for the present invention.
Figure 20:
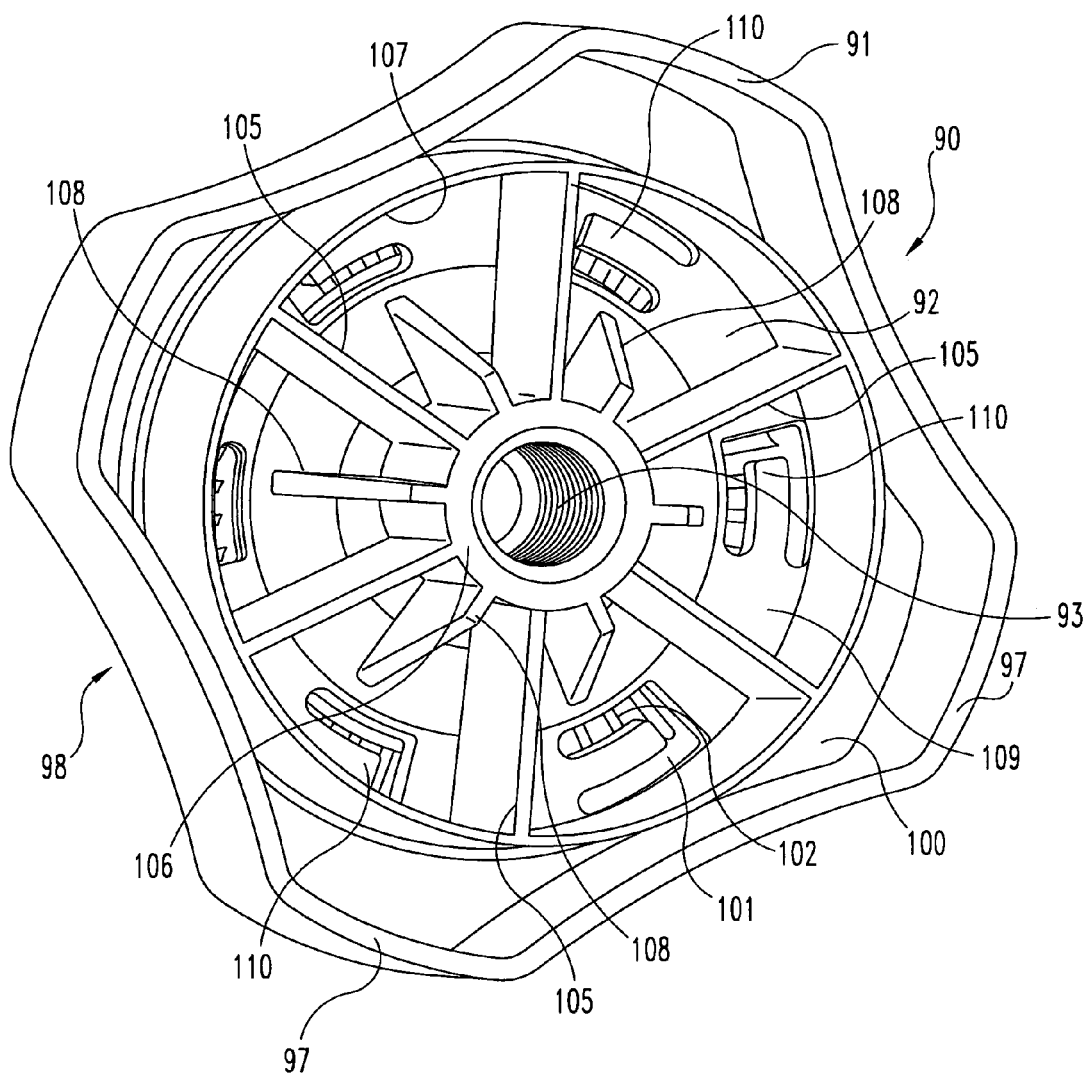
FIG. 20 is a bottom perspective view of the FIG. 19 closing cap.

Another embodiment of the present invention includes an alternative closing lid construction in the form of closing cap 90 as illustrated in FIGS. 19 and 20. Closing cap 90 is ergonomically shaped for easy manual tightening and removal from the remainder of fluid filter 20 by way of the threaded connection to post 43. Closing cap 90 includes a unitary, molded plastic cover 91 and a unitary, molded plastic torque-limiting insert 92. The insert 92 includes a centered bore 93 that is internally threaded for tightening onto post 43. Cover 91 and insert 92 are operably connected together to form a torque-limiting cap 90.

With continued reference to FIGS. 19 and 20, cover 91 includes an alternating series of four radially protruding projections 97 and four concave recesses 98. These eight sections or portions are curved and there is a smooth transition from one to the other. The upper surface 99 of cover 91 is slightly domed for a comfortable fit and feel in the palm of a hand that is being used to advance or remove cap 90 from post 43. The fingers of the hand of the user are able to fit comfortably into recesses 98, using the abutment against projections 97 for manual tightening and untightening of closing cap 90. The hollow interior 100 of cover 91 receives insert 92 and the inner surface 101 is formed with a series of ratchet bumps 102 that cooperate with insert 92 for the described torque limiting construction of cap 90. As would be understood, with regard to ratchet-type structures, they generally permit rotation or travel in a first direction by riding over or sliding over a cooperating protrusion, but then abut against that protrusion in the reverse direction. That abutment may preclude removal of one component from the other or the abutment may be used in a driving sense such as removing cap 90 from post 43.

Insert 92 includes a series of equally-spaced radiating ribs 105 that extend from cylindrical sleeve 106 to outer wall 107. Sleeve 106 defines internally-threaded bore 93. A second series of equally-spaced radiating ribs 108 are in unitary construction with sleeve 106 and in alternating sequence with ribs 105. Ribs 105 and ribs 108 are also in unitary construction with insert surface 109.

Molded into surface 109 are six equally-spaced ratchet projections 110 that are constructed and arranged to cooperate with bumps 102 in order to create the torque limiting capability of closing cap 90. The relationship between cover 91 and inset 92 is such, including the cooperation between bumps 102 and projections 110, that it allows the cover and insert to be manually tightened onto post 43 with bumps 102 driving projections 110 so as to apply insert 92 onto post 43 by the action of cover 91. Since cover 91 is capable of rotating or turning independently of insert 92, it should be understood that this capability works because of the design and cooperation between bumps 102 and projections 110. This cooperation allows the insert to be manually tightened onto post 43 by utilizing cover 91. When the desired torque is achieved, meaning that the insert is sufficiently tightened onto post 43, the disclosed design has the projections 110 deflecting so as to ride up and over the bumps 102 with an audible "click". This causes the cover 91 to rotate without driving the insert 92 and, in this regard, the cap 90 now functions like a gasoline tank cap that "clicks" with free rotation once the insert or inner cap is tightened to the designed torque. The fact that the cap "clicks past" and no longer generates additional torque allows hand tightening without fear of stripping the threads or under-installing cap 90. In the retrograde direction to remove cap 90 from post 43, there is a designed abutment between cover 91 and insert 92, allowing cap 90 to be removed from post 43.

Figure 21:
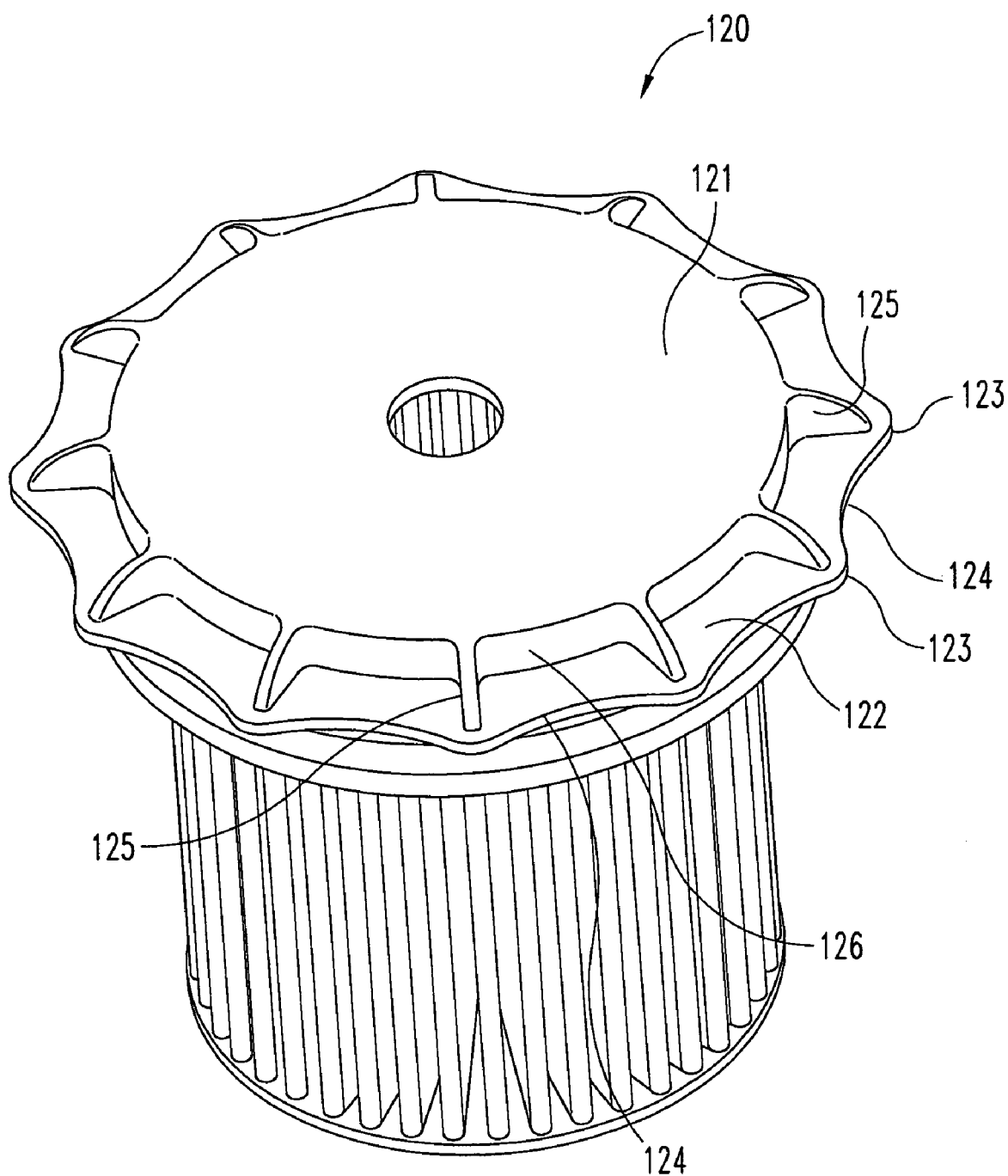
FIG. 21 is a top perspective view of an alternative cover for the FIG. 12 filter assembly.

Referring to FIG. 21, an alternative filter element assembly 120, according to the present invention, is illustrated. Filter element assembly 120 can be considered as being virtually identical to filter element assembly 22, except for cover 51. In order to create filter element assembly 120, cover 51 is removed from filter element assembly 22 and is replaced with a unitary, molded plastic cover 121. The configuration of cover 121 provides at least two improvements.

First, cover 121 includes a radial flange or lip 122 that is scalloped with an alternating sequence of protruding tips 123 and concave edge portions 124. There is a smooth curvature to the transition between edge portions 124 and tips 123 such that tips 123 are rounded and provide a comfortable grip to the user. This alternating sequence of edge portions and tips provides a convenient gripping edge for easy manual removal of filter element assembly 120. For added strength and rigidity considering the molded plastic construction, each tip 123 is braced by a web 125 that is unitary with raised wall 126.

Secondly, radial lip 122 is constructed and arranged with an enlarged outside diameter size as compared to cover 51. This enlarged outside diameter size is configured so as to extend radially beyond the sidewall of the housing that receives filter element assembly 120. In this way, there is a covering or overlap of the housing sidewall that is provided by lip 122. This covering or overlap prevents dirt and contamination from building up on the top of the housing.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A fuel-water separation filtration system for filtering fuel and removing water from the fuel, said filtration system comprising:
    a housing assembly including a unitary housing, a plurality of flow connection fittings, and a standpipe, said unitary housing defining a hollow interior;
    a filter element assembly positioned within the housing and being constructed and arranged for sealing against said housing and for the filtering of fuel, the standpipe extending through said filter element assembly and including an attachment portion axially extending beyond said filter element assembly, said filter element assembly including a cover for closing said hollow interior, said cover defining an aperture for receipt of said standpipe, and a sealing member received by said cover and being axially compressed between said cover and said standpipe; and
    a closing lid attachable to said attachment portion, said closing lid being manually tightenable and cooperating with said cover for sealing closed said hollow interior, wherein the pressurizing of said filtration system requires that said filter element assembly be installed in the housing.

2. The filtration system of claim 1 wherein said filter element assembly includes a second seal positioned between said cover and said housing.

3. The filtration system of claim 2 wherein said filter element includes an endplate and a third seal positioned between said endplate and said standpipe.

4. The filtration system of claim 3 wherein each flow connection fitting of said plurality of flow connection fittings is spin welded into a receiving port that is formed as a unitary portion of said housing.

5. The filtration system of claim 4 wherein said housing includes a base formed with a unitary hub, said standpipe being spin welded onto said unitary hub.

6. The filtration system of claim 5 wherein each flow connection fitting of said plurality of flow connection fittings includes a hex recess formed therein for driving the corresponding fitting into its corresponding receiving port.

7. The filtration system of claim 6 wherein the filter element assembly includes a pleated filter media that is joined at one end to said cover and is joined at an opposite to said endplate.

8. The filtration system of claim 7 wherein said closing lid includes a captured nut for threaded receipt of said attachment portion.

9. The filtration system of claim 8 wherein said closing lid is contoured with gripping portions for facilitating said manual tightening onto said attachment portion.

10. The filtration system of claim 1 wherein said filter element assembly includes a seal positioned between said cover and said housing.

11. The filtration system of claim 1 wherein said filter element includes an endplate and a seal positioned between said endplate and said standpipe.

12. The filtration system of claim 1 wherein each flow connection fitting of said plurality of flow connection fittings is spin welded into a receiving port that is formed as a unitary portion of said housing.

13. The filtration system of claim 1 wherein said housing includes a base formed with a unitary hub, said standpipe being spin welded onto said unitary hub.

14. The filtration system of claim 1 wherein each flow connection fining of said plurality of flow connection fittings includes a hex recess formed therein for driving the corresponding fitting into a corresponding receiving port formed as part of said housing.

15. The filtration system of claim 1 wherein the filter element assembly includes a pleated filter media, a cover, and an endplate wherein the pleated filter media is joined at one end to said cover and is joined at an opposite to said endplate.

16. The filtration system of claim 1 wherein said losing lid includes a captured nut for threaded receipt of said attachment portion.

17. A fuel filter assembly comprising:
- a unitary housing formed with a plurality of flow openings and defining a hollow interior;
- a standpipe assembled to said unitary housing, said standpipe including an attachment portion;
- a filter element assembly positioned within said hollow interior and received by said standpipe, said attachment portion extending axially beyond said filter element assembly, said filter element assembly including a cover for closing said hollow interior, said cover defining an aperture for receipt of said standpipe and a sealing member received by said cover and being axially compressed between said cover and said standpipe; and
- a closing lid attachable to said attachment portion, said closing lid being manually tightenable and cooperating with said cover for sealing closed said hollow interior, wherein the pressurizing of said filtration system requires that said filter element assembly be installed in the housing.

18. The fluid filter assembly of claim 17 wherein said filter element assembly includes a second seal positioned between said cover and said housing.

19. The fluid filter assembly of claim 18 wherein said filter element includes an endplate and a third seal positioned between said endplate and said standpipe.

20. The fluid filter assembly of claim 19 wherein said housing includes a base formed with a unitary hub, said standpipe being spin welded onto said unitary hub.

21. The fluid filter assembly of claim 17 wherein said filter element assembly includes a seal positioned between said cover and said housing.

22. The fluid filter assembly of claim 17 wherein said filter element includes an endplate and a seal positioned between said endplate and said standpipe.

23. The fluid filter assembly of claim 17 wherein said housing includes a base formed with a unitary hub, said standpipe being spin welded onto said unitary hub.

24. A fuel-water separation filtration system for filtering fuel and removing water from the fuel, said filtration system comprising:
- a housing assembly including a unitary housing, a plurality of flow connection fittings, and a standpipe, said unitary housing defining a hollow interior;
- a filter element assembly positioned within the housing and being constructed and arranged for sealing against said housing and for the filtering of fuel, the standpipe extending through said filter element assembly and including an attachment portion axially extending beyond said filter element assembly, said filter element assembly including a cover for closing said hollow interior, said cover defining an aperture for receipt of said standpipe, and a sealing member received by said cover and being positioned radially between a first portion of said standpipe and said cover and axially between a second portion of said standpipe and said cover; and
- a closing lid attachable to said attachment portion, said closing lid being manually tightenable and cooperating with said cover for sealing closed said hollow interior, wherein the pressurizing of said filtration system requires that said filter element assembly be installed in the housing.

25. A fuel filter assembly comprising:
- a unitary housing formed with a plurality of flow openings and defining a hollow interior;
- a standpipe assembled to said unitary housing, said standpipe including an attachment portion;
- a filter element assembly positioned within said hollow interior and received by said standpipe, said attachment portion attending axially beyond said filter element assembly, said filter element assembly including a cover for closing said hollow interior, said cover defining an aperture for receipt of said standpipe and a sealing member received by said cover and being positioned radially between a first portion of said standpipe and said cover and axially between a second portion of said standpipe and said cover; and
- a closing lid attachable to said attachment portion, said closing lid being manually tightenable and cooperating with said cover for sealing closed said hollow interior, wherein the pressurizing of said filtration system requires that said filter element assembly be installed in the housing.

* * * * *